United States Patent
Matsui et al.

(10) Patent No.: US 6,434,686 B1
(45) Date of Patent: Aug. 13, 2002

(54) ADDRESS GENERATING CIRCUIT

(75) Inventors: Masaru Matsui, Gifu; Masato Fuma, Ichinomiya, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/237,804

(22) Filed: Jan. 27, 1999

(30) Foreign Application Priority Data

Jan. 30, 1998 (JP) .............................. 10-020056

(51) Int. Cl.⁷ .............................................. G06F 12/02
(52) U.S. Cl. .................................................... 711/219
(58) Field of Search ................................ 711/217, 218, 711/219; 365/236

(56) References Cited

U.S. PATENT DOCUMENTS 5,138,501 A * 8/1992 Ii et al. ........................ 360/32
5,469,269 A * 11/1995 Yun ............................ 358/335
5,488,658 A * 1/1996 Hirashima ................... 380/215
5,842,169 A * 11/1998 Sakashita .................... 704/278

* cited by examiner

*Primary Examiner*—Hiep T. Nguyen
(74) *Attorney, Agent, or Firm*—Cantor Colburn LLP

(57) ABSTRACT

A write address counter counts a write clock WCK and determines output as a write address, while read address counter counts a read clock RCK and determines output as a read address. The position of LSB in both the counters is shifted by the same number of bits at predetermined intervals, and the position of LSB of the read address counter before shifting is corresponded with the shifted position of the write address counter after shifting. Both the counters count and determine their outputs as write and read addresses. Thus, memory capacity can be reduced, and data can be written and read with different write and read orders.

5 Claims, 3 Drawing Sheets

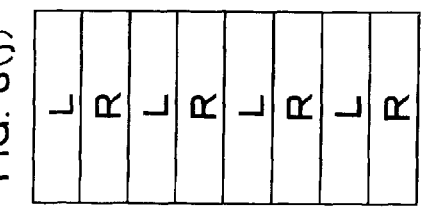
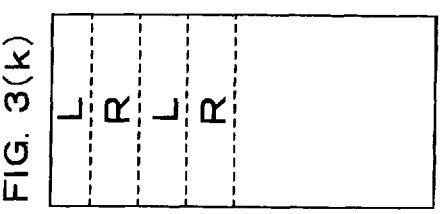
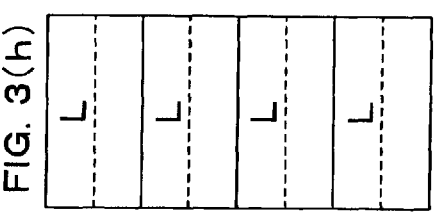
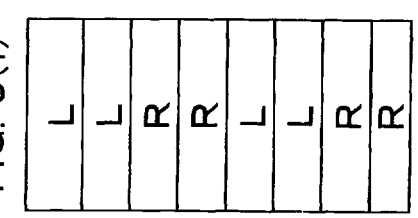
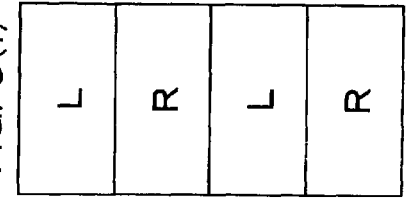
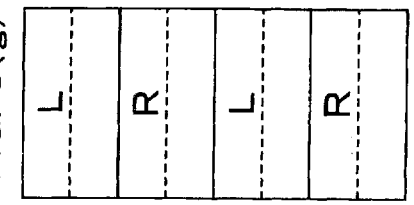
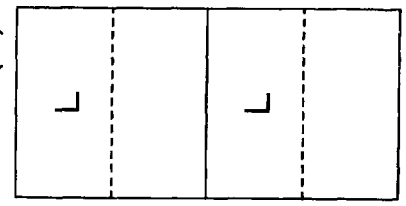
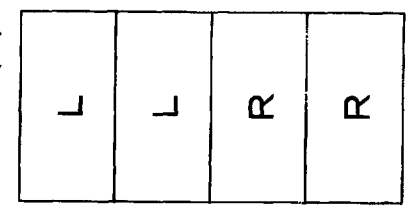
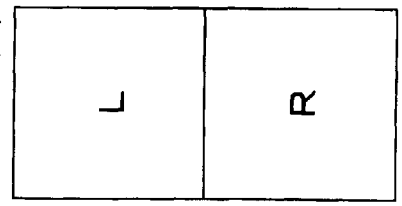
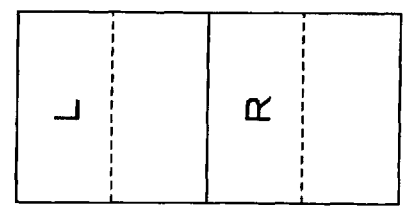
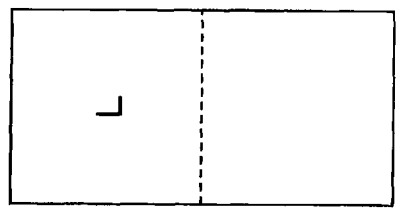

ADDRESS GENERATING CIRCUIT

BACKGROUND OF THE INVENTION

1. Technical Field of the Invention

The invention relates to an address generating circuit for generating an access address to a memory for storing data, and more particularly to an address generating circuit suitable to read data, which was written in the memory, with its order changed.

2. Description of the Related Art

Conventionally, audio data and image data are encoded and compressed when stored or transmitted, then expanded and decoded when reproduced or received.

For example, when recording an MD (mini disc), a speech signal is converted into digital data (A/D conversion), which is then divided into three bands such as low, middle, and high (frequency bands) by a digital filter called QMF (Quadrature Mirror Filter). The obtained data is subjected to MDCT (Modified Discrete Cosine Transform) processing, quantizing processing, or the like and written on the MD. When the MD is played, the data is inversely processed by reverse quantizing, IMDCT (Inverse MDCT), inverse-filtering by IQMF (Inverse QMF), and D/A conversion.

In performing the above-described processing, a memory is required in order to store data being processed. For example, the memory temporarily stores data being sent from the preceding filter and reads it before the MDCT processing is performed.

MDCT and IMDCT process data by dividing it into 1SG (sound group) for every 11.6 msec. This 1SG corresponds to 1024 words, but MDCT and IMDCT process 1024+192 words in order to overlap slightly data across the boundary of the sound groups. Therefore, IMDCT outputs for example 1024+192 words of data for every 1SG. And, 1024 words of data is supplied to IQMR for every 1SG.

IMDCT separately outputs data of an L (left) channel and data of a R (right) channel. Specifically, for 1SG of data, data of the L channel is output, then data of the R channel is output. Meanwhile, data of the L channel and that of the R channel are alternately output to IQMF.

A capacity of 2240 words is provided for the memory by adding a capacity for writing the output data from IMDCT and a capacity for reading and used to read 1SG of data after the completion of writing. Therefore, a memory capacity therefor is 1024×2+191=2240 words.

Thus, the provision of the capacities for writing and reading for 1SG of data allows to write and read without any problem by switching a writing area and a reading area for every period of 1SG.

However, it is desirable that the memory capacity be made as small as possible. Since reading can be made without writing 1SG of data in the memory, the memory capacity may be made small by a device able to manage the memory.

SUMMARY OF THE INVENTION

It is an object of the invention to provide an address generating circuit with a small memory capacity.

The invention relates to an address generating circuit for generating an access address to a memory for storing a predetermined amount of data comprising a counter of a predetermined number of bits and which counts prescribed clocks to determine output as an access address, wherein the position of a least significant bit (LSB) of output from the counter is counted in a state shifted by a predetermined number of bits at intervals of predetermined time, and output from the counter is determined as an address.

The invention also relates to an address generating circuit for generating a writing address to and a reading address from a memory for storing a predetermined amount of data comprising a write address counter with a predetermined number of bits and which counts a first clock and determines output as a write address; and a read address counter with a predetermined number of bits which counts a second clock and determines output as a read address, wherein the positions of least significant bits (LSB) of output from both counters is shifted by the same number of bits at intervals of predetermined time, the position of a least significant bit of output from the read address counter prior to shifting is corresponded with the shift position of the write address counter after shifting and counted by both the counters. Counting is made by both the counters in this state, and the counted outputs are determined as a write address and a read address.

The present invention sequentially writes into areas from which reading is completed. Therefore, total memory capacity can be used efficiently and a need for excessively large capacity can be eliminated.

BRIEF DESCRIPTION OF THE DRAWINGS

FIGS. 3(a), 3(b), 3(c), 3(d), 3(e), 3(f), 3(g), 3(h), 3(i), 3(j), 3(k) are diagrams showing a procedure to write into a memory.

DESCRIPTION OF THE PREFERRED EMBODIMENT

A preferred embodiment of the present invention will be described below with reference to the attached drawings.

Figure 1:
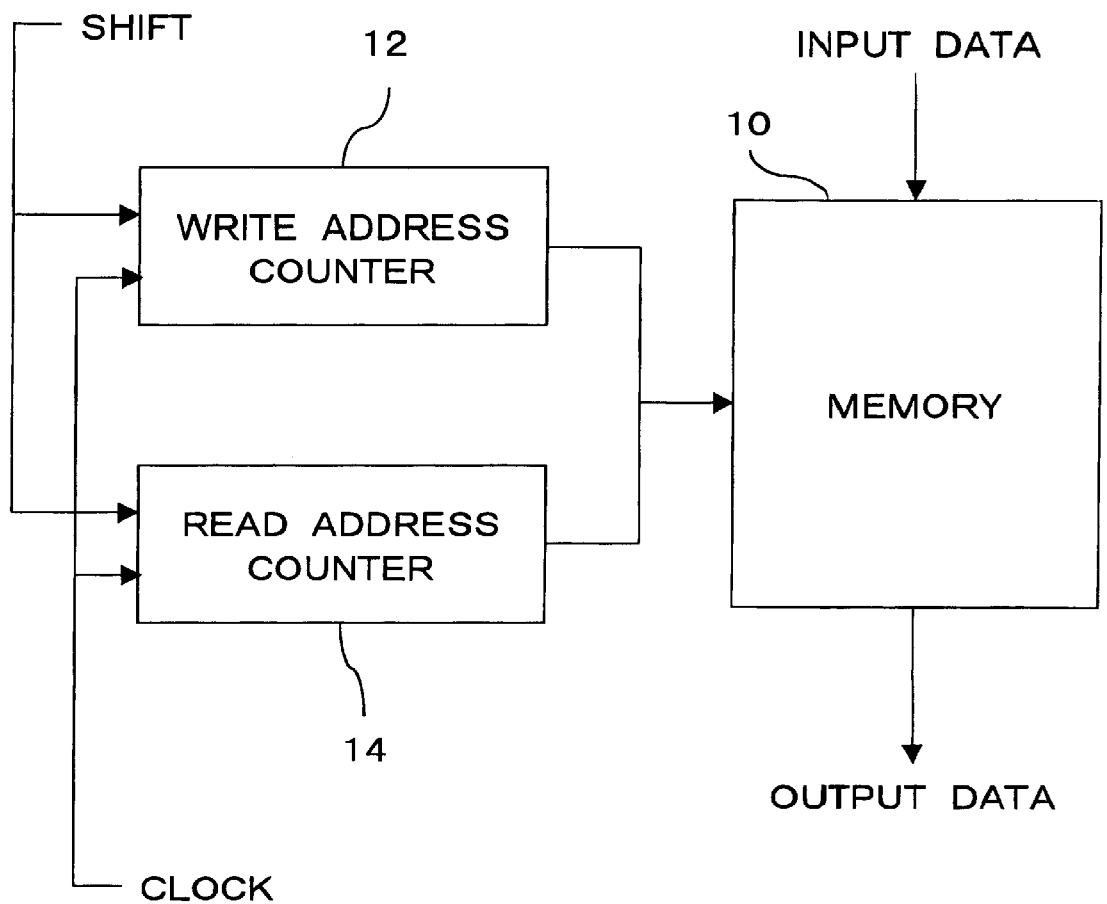
FIG. 1 is a block diagram showing the configuration of an embodiment of the present invention.

FIG. 1 is a block diagram showing the configuration of the present embodiment, in which data from IMDCT is written as input data into a memory 10. Data read from the memory 10 is sent to IQMF. In the example description, for convenience the memory 10 has a capacity of 1024 words and 0–1023 addresses.

The address for writing input data into the memory 10 is determined by an address signal from a write address counter 12. The write address counter 12 is a 10-bit counter of a9, a8, a7, . . . a1, a0 and counts a write clock WCK to generate 0–1023 addresses.

The read address to the memory 10 is determined according to an address signal from a read address counter 14. The read address counter 14 is also a 10-bit counter of a9, a8, a7, . . . a1, a0 and counts a read clock RCK to generate 0–1023 addresses.

The write address counter 12 and the read address counter 14 an change the position of LSB (least significant bit). Specifically, when shift signals SF1, SF2 are entered the write address counter 12 and the read address counter 14, they are counted with the position of LSB shifted by 3 bits. For example, after a9, a8, a7, a6, a5, a4, a3, a2, a1, a0 come a6, a5, a4, a3, a2, a1, a0, a9, a8, a7. Thus, a7 becomes LSB, and the write clock WCK or the read clock RCK is counted up.

Figure 2:
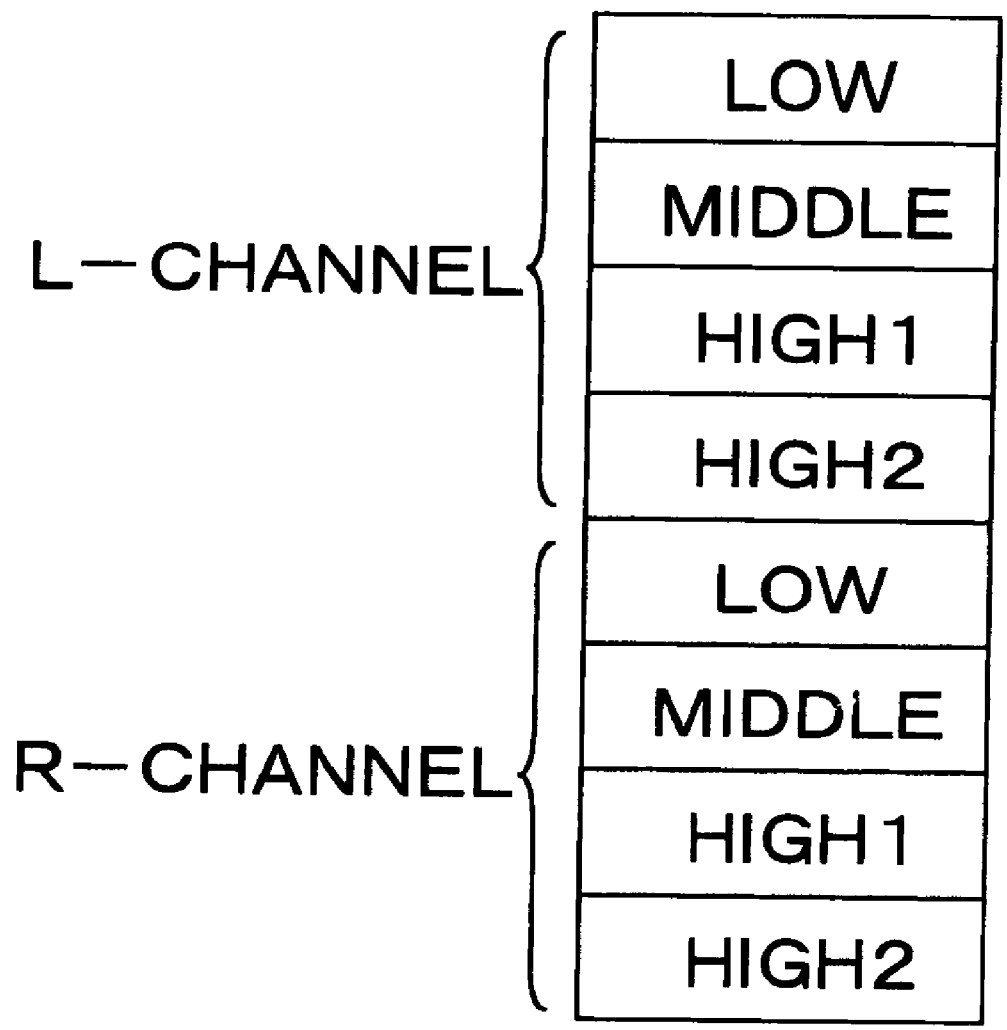
FIG. 2 is a diagram showing writing into a memory.

When the input data on 1SG output from the IMDCT is written in the memory 10 by counting up the write address counter 12 from 0 and data of the L channel is written successively, data of the R channel is then written successively. Both data of the L channel and the R channel are divided into three ranges, high, middle, and low. These data are generated by a two-stage QMF, namely the input data is separated into a low+middle range and a high range in the first stage, and data of the low+middle range is separated into low and middle ranges in the second stage. Therefore, high range data has a quantity two times larger than each of the low range and middle range data. Therefore, as shown in FIG. 2, low and middle range data are respectively stored in one block of 128 words, and high-range data is divided into high ranges 1 and 2 and stored in one block of 128 words.

To read data which are written in the memory 10, it is necessary to read data from the respective bands in order. Therefore, the read address counter 14 shifts its inner bits by 3 bits. Specifically, the order is changed to a6, a5, a4, a3, a2a, a1, a0, a9, a8, a7, and bit a7 is determined as LSB to count up. Thus, when reading, the address proceeds by 128, and the words are read one by one in order of the low range, middle range, high range 1 and high range 2 of the L channel and the low range, middle range, high range 1 and high range 2 of the R channel.

After data is written into the memory 10, it is read out after a lapse of a predetermined period. After the completion of reading such data from the memory 10, additional data is newly written into the memory 10. Therefore, there is given a predetermined time lag between data write timing and data read timing. In this embodiment, upon completion of writing data for 0.5SG, reading of the same data is started, so that the data written as described above is read in predetermined order.

When such writing and reading are performed for a period of 1SG, the writing address counter 12 displaces the bit position by 3 bits. In other words, the write address counter 12 has the same write address as the above-described read address, or as follows.

a6, a5, a4, a3, a2a, a1, a0, a9, a8, a7

Thus, data is written into an area which is a half the size of each original area. This area is an area from which reading has completed as described above. Therefore, data not read is never rewritten by this writing.

Meanwhile, the bit position of the read address is shifted by 3 bits after a lapse of 0.5SG. Therefore, it becomes a3, a2a, a1, a0, a9, a8, a7, a6, a5, a4. Accordingly, reading is performed successively from the head of the respective areas in which data is written as described above.

By repeating the above-described procedure, data is always written into an already read area, while reading is performed on the already written area. Accordingly, the memory 10 can have a capacity for 1SG only to deal with writing and reading of data.

Here, the operation described above is described with reference to FIG. 3(a) through FIG. 3(k). In these drawings, two types of data of L and R channels are shown for simplification. Data of L and R channels are written in this order, and L and R are successively read for words one by one. Addresses are 0 to 7, and the write address counter 12 and the read address counter 14 are 3 bits of a2, a1, a0.

First, the write address counter 12 is used in order of a2, a1, a0 to complete writing 0.5SG of data. At this time, data of the L channel is written at the upper half of the memory 10 as shown in FIG. 3(a). Then, when first data of the R channel is written (0.5SG), reading is started according to the read address counter 14.

At this point, the read address counter 14 counts in order of a1, a0, a2. Thus, reading is alternately made from the L and R channels for words one by one as 000, 100, 001, 101, . . .

When writing 1SG of data is complete, memory 10 is as shown in FIG. 3(b). At this point, reading is complete for half of each area of the L and R channels as shown in FIG. 3(c).

Then, LSB of the write address counter 12 is shifted by 1 bit as a1, a0, a2, which is the same as the above-described read address. Therefore, for a period of 0.5SG after that, data of the L channel is written in the area from which reading has been completed. In other words, data is written in the areas L as shown in FIG. 3(d).

After a lapse of the period of 0.5SG in the state described above (1.5SG), writing in the areas L shown in FIG. 3(d) is completed. Meanwhile, reading of data of the first written L and R channels is completed as shown in FIG. 3(e).

Therefore, the position of LSB of the read address counter 14 is shifted. Thus, the order of bits in the read address counter 14 is a0, a2, a1. Reading from the areas indicated as L and R in FIG. 3(g) is then started.

After a lapse of a period of 2SG, writing in all areas L, R shown in FIG. 3(f) is complete. Meanwhile, reading from a half of each of the areas L, R shown in FIG. 3(g) is complete. Then, the position of LSB of the write address counter 12 is shifted to the order of a0, a2, a1. Thus, writing of data in the areas L shown in FIG. 3(h) is started.

After a lapse of 2.5SG, writing of data of the write channel in the areas L of FIG. 3(h) is complete, and writing in the R channel is started. Meanwhile, reading is complete as shown in FIG. 3(i). Then, LSB of the read address counter 14 is shifted to have a bit order a2, a1, a0. Thus, the areas L, R as shown in FIG. 3(i) are read sequentially.

After a lapse of 3SG, writing is complete as shown in FIG. 3(j). At this stage, reading of data from the upper half is complete as shown in FIG. 3(k). Then, the order of bits of the write address counter 12 is changed to a2, a1, a0, and writing is started in the order shown in FIG. 3(a).

Thus, data writing and reading are made with the order changed. Accordingly, the capacity of the memory 10 may correspond with the amount of data input during the period of 1SG.

In the embodiment described above, reading was switched for every word. Therefore, when the read unit is divided into a single word unit, the next reading is made continuously. By the division of the access address up to this stage, one cycle of the address shift is completed. In other words, the write area and the read area are divided, and when reading becomes continuous, one cycle is completed.

As described above, data can be read or written with a memory of reduced capacity according to the present invention.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. An address generating circuit for generating an access address to a memory for storing a predetermined amount of data, comprising:

a counter of a predetermined number of bits which counts clock pulses of a prescribed clock to determine output as an access address; wherein the position of a least significant bit of the counter is shifted by a predetermined number of bits at a predetermined interval, and output from the counter is determined as an address.

2. An address generating circuit for generating a writing address and a reading address from a memory for storing a predetermined amount of data, comprising:

a write address counter with a predetermined number of bits which counts clock pulses of a first clock and determines output as a write address; and a read address counter with a predetermined number of bits which counts clock pulses of a second clock and determines output as a read address;

wherein the positions of least significant bits of both of the counters are shifted by the same number of bits at predetermined intervals, the position of a least significant bit of the read address counter prior to shifting is corresponded with the position of the least significant bit of the write address counter after shifting.

3. The circuit according to claim 2, wherein:

the data written into the memory includes speech data with left channel data and right channel data alternately input for every sound group comprising a predetermined plurality of words, and the left channel data and the right channel data are output for every word from the memory.

4. The circuit according to claim 3, wherein the positions of the least significant bit of the write counter and the read counter are shifted every time writing or reading of a single sound group is completed.

5. The circuit according to claim 4, wherein the shifting of the least significant bit causes an area into which writing will be made to be a half of an area into which writing is previously made.

* * * * *